United States Patent [19]
Bearden

[11] Patent Number: 6,032,702
[45] Date of Patent: Mar. 7, 2000

[54] SHEATHING STRIP WITH MATING SIDE EDGES

[76] Inventor: John F. Bearden, 10861 Main St., Potter Valley, Calif. 95469-9733

[21] Appl. No.: 09/013,989

[22] Filed: Jan. 27, 1998

[51] Int. Cl.[7] .................................................. F16L 9/17
[52] U.S. Cl. ........................ 138/166; 138/165; 138/167; 138/169; 174/109
[58] Field of Search .................................. 138/162, 163, 138/165, 166, 167, 168, 169; 174/110 R, 109

[56] References Cited

U.S. PATENT DOCUMENTS

| | | | |
|---|---|---|---|
| 1,485,994 | 3/1924 | Salisbury . | |
| 2,275,019 | 3/1942 | Peterson . | |
| 3,117,371 | 1/1964 | Farley | 29/450 |
| 3,199,541 | 8/1965 | Richitelli | 138/129 |
| 3,900,697 | 8/1975 | Yotsugi . | |
| 4,422,478 | 12/1983 | Pentney et al. | 138/166 |
| 4,566,496 | 1/1986 | Menzel et al. | 138/129 |
| 4,630,650 | 12/1986 | Davis | 138/154 |
| 4,733,629 | 3/1988 | Hunt et al. . | |
| 4,835,054 | 5/1989 | Scarpa | 428/377 |
| 4,865,890 | 9/1989 | Erlichman | 138/166 |
| 4,869,295 | 9/1989 | Keldany | 138/122 |
| 5,660,912 | 8/1997 | Menzel | 138/129 |

*Primary Examiner*—James F. Hook
*Attorney, Agent, or Firm*—Joseph N. Breaux

[57] ABSTRACT

A sheathing strip with mating side edges that includes a flexible plastic film sheathing strip having a nominal thickness of less than twenty thousandths of one inch, first and second side surfaces, and first and second strip side edges; a first mating side edge formed onto the first side surface of the first side edge of the sheathing strip; and a second mating side edge formed onto the second side surface of the second side edge of the sheathing strip. The first and second mating side edges mate to form a tubular sheath when the sheathing strip is wrapped helically around a bundle of wires or the like.

4 Claims, 2 Drawing Sheets

SHEATHING STRIP WITH MATING SIDE EDGES

TECHNICAL FIELD

The present invention relates to sheathing structures for wire bundles and the like and more particularly to a sheathing strip including a flexible plastic film sheathing strip having a nominal thickness of less than twenty thousandths of one inch, first and second side surfaces, and first and second strip side edges; a first mating side edge formed onto the first side surface of the first side edge of the sheathing strip; and a second mating side edge formed onto the second side surface of the second side edge of the sheathing strip; the first mating side edge including a receiving channel and a locking tab, the receiving channel being defined by two parallel channel sidewalls and a semi-circular profile bottom, the locking tab having an angled exterior surface oriented at a forty-five degree angle with respect to the parallel channel sidewalls that define the receiving channel, the angled exterior surface being positioned between the first side surface of the first side edge of the flexible plastic sheathing strip and a semi-circular shaped insertion lip, the semi-circular insertion lip being located a distance "A" from the nearest parallel channel sidewall; the second mating side edge including an insertion strip and a locking tab receiving structure, the insertion strip extending away from the second side surface of the second side edge, the locking tab receiving structure having an outwardly directed defining structure having a semi-circular groove formed therein, the semi-circular groove being oriented such that a structure portion of the second surface of the second side edge is contiguously formed with a groove surface of the defining structure defining the semi-circular groove, the structure portion being of a width "B" that is equal to distance "A"; the first and second mating edges being mateable such that the locking tab of the first mating side edge is positioned into the locking tab receiving structure of the second mating side edge, and the insertion strip of the second mating side edge is positioned into the receiving channel of the first mating side edge.

BACKGROUND ART

It is often desirable to provided a protective sheath for a bundle of wires or the like. One method of providing such a sheath is to wrap the bundle of wires with a strip of adhesive backed sheathing material. Although this can provide an adequate sheath in some circumstances, it is often desirable to provide a sheath that can be held in place without adhesives and that can be removed when access to one or more of the wires is required. It would be desirable, therefore, to have a sheathing strip that included side edges that were mateable to form a closed sheath when the strip is wound helically about a bundle of wires.

GENERAL SUMMARY DISCUSSION OF INVENTION

It is thus an object of the invention to provide a sheathing strip that can be wound about a bundle of wires or the like and held in place without the use of adhesives.

It is a further object of the invention to provide a sheathing strip with mating side edges that mate to form a sheath when the sheathing strip is wound helically about a bundle of wires.

It is a still further object of the invention to provide a sheathing strip with mating side edges that includes a flexible plastic film sheathing strip having a nominal thickness of less than twenty thousandths of one inch, first and second side surfaces, and first and second strip side edges; a first mating side edge formed onto the first side surface of the first side edge of the sheathing strip; and a second mating side edge formed onto the second side surface of the second side edge of the sheathing strip; the first mating side edge including a receiving channel and a locking tab, the receiving channel being defined by two parallel channel sidewalls and a semi-circular profile bottom, the locking tab having an angled exterior surface oriented at a forty-five degree angle with respect to the parallel channel sidewalls that define the receiving channel, the angled exterior surface being positioned between the first side surface of the first side edge of the flexible plastic sheathing strip and a semi-circular shaped insertion lip, the semi-circular insertion lip being located a distance "A" from the nearest parallel channel sidewall; the second mating side edge including art insertion strip and a locking tab receiving structure, the insertion strip extending away from the second side surface of the second side edge, the locking tab receiving structure having an outwardly directed defining structure having a semi-circular groove formed therein, the semi-circular groove being oriented such that a structure portion of the second surface of the second side edge is contiguously formed with a groove surface of the defining structure defining the semi-circular groove, the structure portion being of a width "B" that is equal to distance "A"; the first and second mating edges being mateable such that the locking tab of the first mating side edge is positioned into the locking tab receiving structure of the second mating side edge, and the insertion strip of the second mating side edge is positioned into the receiving channel of the first mating side edge.

It is a still further object of the invention to provide a sheathing strip with mating side edges that accomplishes some or all of the above objects in combination.

Accordingly, a sheathing strip with mating side edges is provided. The sheathing strip with mating side edges comprises a flexible plastic film sheathing strip having a nominal thickness of less than twenty thousandths of one inch, first and second side surfaces, and first and second strip side edges; a first mating side edge formed onto the first side surface of the first side edge of the sheathing strip; and a second mating side edge formed onto the second side surface of the second side edge of the sheathing strip; the first mating side edge including a receiving channel and a locking tab, the receiving channel being defined by two parallel channel sidewalls and a semi-circular profile bottom, the locking tab having an angled exterior surface oriented at a forty-five degree angle with respect to the parallel channel sidewalls that define the receiving channel, the angled exterior surface being positioned between the first side surface of the first side edge of the flexible plastic sheathing strip and a semi-circular shaped insertion lip, the semi-circular insertion lip being located a distance "A" from the nearest parallel channel sidewall; the second mating side edge including an insertion strip and a locking tab receiving structure, the insertion strip extending away from the second side surface of the second side edge, the locking tab receiving structure having an outwardly directed defining structure having a semi-circular groove formed therein, the semi-circular groove being oriented such that a structure portion of the second surface of the second side edge is contiguously formed with a groove surface of the defining structure defining the semi-circular groove, the structure portion being of a width "B" that is equal to distance "A"; the first and second mating edges being mateable such that the locking tab of the first mating side edge is positioned rilto he locking tab receiving structure of the second mating side edge, and the insertion strip of the second mating side edge is positioned into the receiving channel of the first mating side edge.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
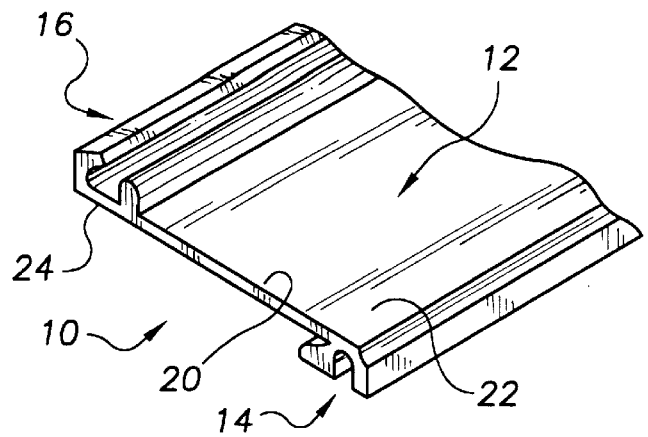
FIG. 1 is a perspective view of an exemplary embodiment of the sheathing strip with mating side edges of the present invention showing the first and second mating side edges formed onto the first and second side edges of the flexible, plastic film, sheathing strip.
Figure 2:
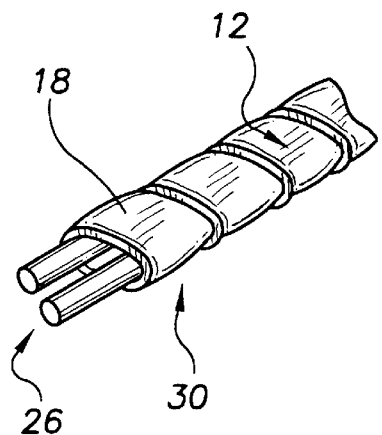
FIG. 2 is a perspective view showing a length of the exemplary sheathing strip with mating side edges wound about a pair of representative wires with the first and second mating side edges mated to form a continuous sheath about a portion of the representative wires.
Figure 3:
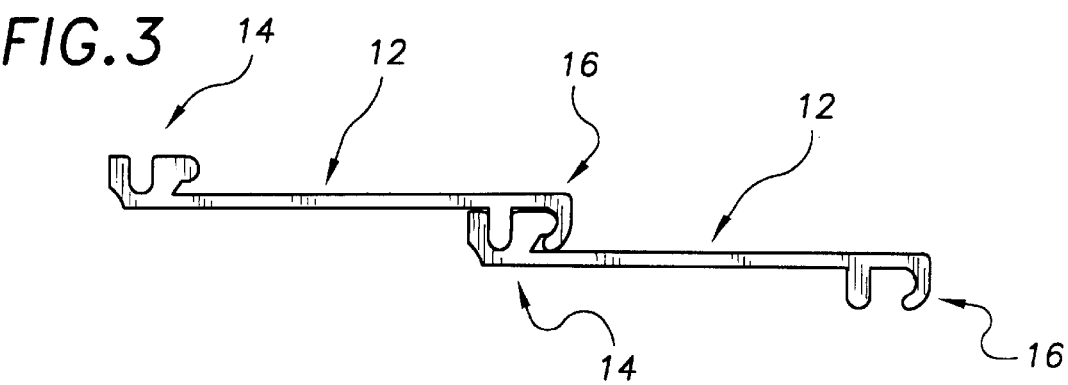
FIG. 3 is a side end view showing two sections of the sheathing strip with mating side edges of FIG. 1 with the first mating side edge of one of the sections mated to the second mating side edge of the other section.

FIG. 1 shows an exemplary embodiment of the sheathing strip with mating side edges of the present invention generally designated by the numeral 10. In this embodiment, sheathing strip with mating side edges 10 includes a sheathing strip 12; a first mating side edge, generally designated 14; and a second mating side edge, generally designated 16. Sheathing strip 12 is constructed from one-half mil thick, flexible plastic film, and includes a first side surface 18 (shown in FIG. 2), a second side surface 20, a first side edge portion 22, and a second side edge portion 24. First and second mating side edges 14,16 interconnect (see FIG. 3) when sheathing strip 12 is wrapped, referring now to FIG. 2, about a bundle of wires 26 to form a tubular sheath, generally designated 30.

Figure 3A:
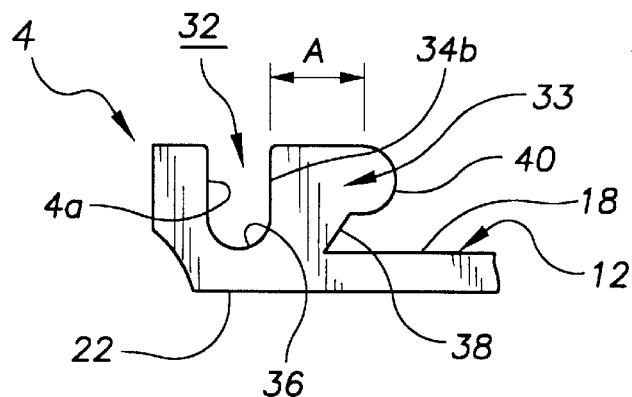
FIG. 3A is a detail end view of the first mating side edge secured to the first side surface of the first side edge of the flexible plastic sheathing strip showing the receiving channel defined by the parallel channel sidewalls and terminating with the semi-circular profile bottom; and the locking tab having an angled exterior surface oriented at a forty-five degree angle with respect to the parallel channel sidewalls that define the receiving channel, the angled exterior surface being positioned between the first side edge of the flexible plastic sheathing strip and a semi-circular shaped insertion lip, the semi-circular insertion lip being positioned a distance "A" from the nearest parallel channel sidewall.

With reference to FIG. 3A, first mating side edge 14 is integrally formed with and secured to first side surface 18 of first side edge 22 of flexible plastic sheathing strip 12. First mating side edge 14 includes a receiving channel, generally designated 32 and a locking tab, generally designated 33. Receiving channel 32 is defined by two parallel channel sidewalls 34a,34b and a semi-circular profile bottom 36. Locking tab 33 has an angled exterior surface 38 that is oriented at a forty-five degree angle with respect to parallel channel sidewalls 34a,34b. Angled exterior surface 38 is positioned between first side edge 22 of flexible plastic sheathing strip 12 and a semi-circular shaped insertion lip 40. Semi-circular insertion lip 40 is positioned a distance "A" of one-sixteenth of one inch from the nearest parallel channel sidewall 34b.

Figure 3B:
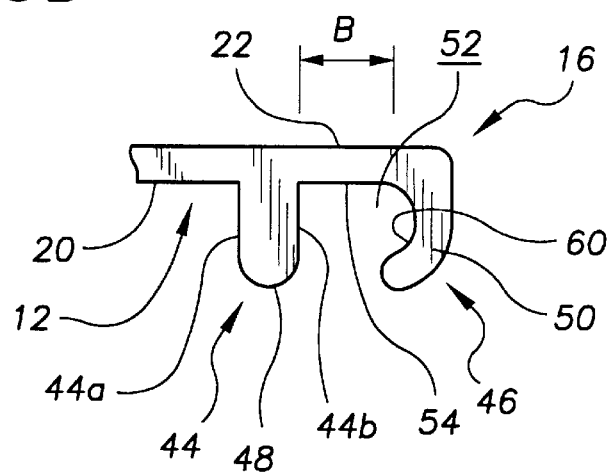
FIG. 3B is a detail end view of the second mating side edge secured to the second side surface of the second side edge of the flexible plastic sheathing strip showing the insertion strip extending away from the second side surface, the insertion strip having parallel strip sidewalls terminating with a semi-circular crown portion; and the locking tab receiving structure having an outwardly directed defining structure having a semi-circular groove formed therein, the semi-circular groove being oriented such that a structure portion of the second surface of the second side edge is contiguously formed with the groove surface of the defining structure defining the semi-circular groove, the structure portion being of a width "B" that is equal to distance "A".

With reference to FIG. 3B, second mating side edge 16 is Integrally formed with and secured to second side surface 20 of second side edge 22 of flexible plastic sheathing strip 12. Second mating side edge 16 includes an insertion strip, generally designated 44, that extends away from second side surface 20; and locking tab receiving structure, generally designated 46. Insertion strip 44 has parallel strip sidewalls 44a,44b that terminate on either side of a semi-circular crown portion 48. Locking tab receiving structure 46 has an outwardly directed defining structure 50 having a semi-circular groove 52 formed therein. Semi-circular groove 52 is oriented such that a structure portion 54 of second surface 20 of second side edge 22 is contiguously formed with a groove surface 60 of defining structure 50. Structure portion 54 is of a width "B" of one-sixteenth of one inch that is equal to distance "A".

Figure 4:
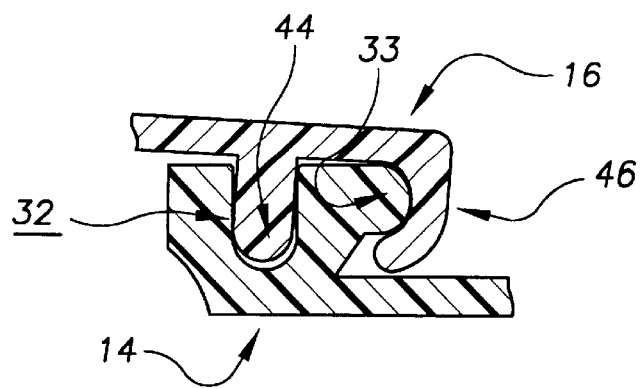
FIG. 4 is a detail view showing the first and second mating edges mated to form a connection between the first and second side edges of the flexible plastic sheathing strip; the locking tab of the first mating side edge being inserted into the locking tab receiving structure of the second mating side edge, the insertion strip of the second mating side edge being inserted into the receiving channel of the first mating side edge.

Referring now to FIG. 4, in use, first and second mating edges 14,16 are interconnected when sheathing strip 12 is wound into a helical spiral configuration (shown in FIG. 2) such that locking tab 33 of first mating side edge 14 is inserted into locking tab receiving structure 46 of second mating side edge 16 and insertion strip 44 of second mating side edge 16 is inserted into receiving channel 32 of first mating side edge 14.

It can be seen from the preceding description that a sheathing strip that can be wound about a bundle of wires or the like and held in place without the use of adhesives has been provided that includes mating side edges that mate to form a sheath when the sheathing strip is wound helically about a bundle of wires; and that includes a flexible plastic film sheathing strip having a nominal thickness of less than twenty thousandths of one inch, first and second side surfaces, and first and second strip side edges; a first mating side edge formed onto the first side surface of the first side edge of the sheathing strip; and a second mating side edge formed onto the second side surface of the second side edge of the sheathing strip; the first mating side edge including a receiving channel and a locking tab, the receiving channel being defined by two parallel channel sidewalls and a semi-circular profile bottom, the locking tab having an angled exterior surface oriented at a forty-five degree angle with respect to the parallel channel sidewalls that define the receiving channel, the angled exterior surface being positioned between the first side surface of the first side edge of the flexible plastic sheathing strip and a semi-circular shaped insertion lip, the semi-circular insertion lip being located a distance "A" from the nearest parallel channel sidewall; the second mating side edge including an insertion strip and a locking tab receiving structure, the insertion strip extending away from the second side surface of the second side edge, the locking tab receiving structure having an outwardly directed defining structure having a semi-circular groove formed therein, the semi-circular groove being oriented such that a structure portion of the second surface of the second side edge is contiguously formed with a groove surface of the defining structure defining the semi-circular groove, the structure portion being of a width "B" that is equal to distance "A"; the first and second mating edges being mateable such that the locking tab of the first mating side edge is positioned into the locking tab receiving structure of the second mating side edge, and the insertion strip of the second mating side edge is positioned into the receiving channel of the first mating side edge.

It is noted that the embodiment of the sheathing strip with mating side edges described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A sheathing strip with mating side edges comprising:
   a flexible plastic film sheathing strip having a nominal thickness of less than twenty thousandths of one inch, first and second side surfaces, and first and second strip side edges;
   a first mating side edge formed onto said first side surface of said first side edge of said sheathing strip; and
   a second mating side edge formed onto said second side surface of said second side edge of said sheathing strip;
   said first mating side edge including a receiving channel and a locking tab, said receiving channel being defined by two parallel channel sidewalls and a semi-circular profile bottom, said locking tab having an angled exterior surface oriented at a forty-five degree angle with respect to said parallel channel sidewalls that define said receiving channel, said angled exterior surface being positioned between said first side surface of said first side edge of said flexible plastic sheathing strip and a semi-circular shaped insertion lip, said semi-circular insertion lip being located a distance "A" from said nearest parallel channel sidewall;
   said second mating side edge including an insertion strip and a locking tab receiving structure, said insertion strip extending away from said second side surface of said second side edge, said locking tab receiving structure having an outwardly directed defining structure having a semi-circular groove formed therein, said semi-circular groove being oriented such that a structure portion of said second surface of said second side edge is contiguously formed with a groove surface of said defining structure defining said semi-circular groove, said structure portion being of a width "B" that is equal to distance "A";
   said first and second mating edges being mateable such that said locking tab of said first mating side edge is positioned into said locking tab receiving structure of said second mating side edge, and said insertion strip of said second mating side edge is positioned into said receiving channel of said first mating side edge.

2. The sheathing strip with mating side edges of claim 1, wherein:
   said first mating side edge is integrally formed with said flexible plastic film sheathing strip.

3. The sheathing strip with mating side edges of claim 1, wherein:
   said second mating side edge is integrally formed with said flexible plastic film sheathing strip.

4. The sheathing strip with mating side edges of claim 3, wherein:
   said first mating side edge is integrally formed with said flexible plastic film sheathing strip.

* * * * *